United States Patent [19]

Johnson

[11] 4,232,851
[45] Nov. 11, 1980

[54] FLUID CONTROL VALVE AND LINER THEREFOR

[75] Inventor: Dwight N. Johnson, El Toro, Calif.

[73] Assignee: Textron Inc., Providence, R.I.

[21] Appl. No.: 10,141

[22] Filed: Feb. 6, 1979

Related U.S. Application Data

[63] Continuation-in-part of Ser. No. 730,962, Oct. 8, 1976, Pat. No. 4,198,029.

[51] Int. Cl.³ .................................... F16K 31/126
[52] U.S. Cl. ................................. 251/61.1; 92/98 D;
    137/219; 251/DIG. 2; 251/46
[58] Field of Search ................... 92/98 D, 99 R, 100;
    137/219, 220, 625.28, 625.3; 251/5, DIG. 2, 25,
    61.1, 61.2, 46

[56] References Cited

U.S. PATENT DOCUMENTS

| | | | |
|---|---|---|---|
| 2,545,857 | 3/1951 | Perkins et al. | 92/98 R |
| 2,556,596 | 6/1951 | Perkins et al. | 92/98 R |
| 2,638,127 | 5/1953 | Griswold | 92/98 R |
| 2,781,051 | 2/1957 | Hawley | 137/219 |
| 2,868,492 | 1/1959 | Volcov et al. | 251/46 |
| 3,038,488 | 6/1962 | Welch et al. | 251/61.1 |
| 3,212,446 | 10/1965 | Golden et al. | 92/98 R |
| 3,212,768 | 10/1965 | Casimir | 92/98 R |
| 3,574,310 | 4/1971 | Souriau | 251/61.1 |
| 3,690,344 | 9/1972 | Brumm | 251/61.1 |
| 3,836,113 | 9/1974 | Johnson | 251/61.1 |

FOREIGN PATENT DOCUMENTS

| | | | |
|---|---|---|---|
| 1152583 | 8/1963 | Fed. Rep. of Germany | 251/61.1 |
| 1913355 | 10/1969 | Fed. Rep. of Germany | 251/61.1 |
| 1245356 | 9/1971 | United Kingdom | 92/98 D |

*Primary Examiner*—Martin P. Schwadron
*Assistant Examiner*—G. L. Walton
*Attorney, Agent, or Firm*—Fitch, Even, Tabin, Flannary & Welsh

[57] ABSTRACT

A valve for controlling fluid flow in a fluid system such as a pipeline which includes a body defining an internal chamber in fluid connection with an inlet and an outlet. The valve further includes a deformable valve liner mounted within the chamber which sits against a valve seat and a frustoconical grill having a plurality of ports therein. The liner and the body define a control chamber which is coupled to a source of controlled pressure. A relief region is provided between the liner and the grill at the plane of intersection of the liner and the grill.

7 Claims, 8 Drawing Figures

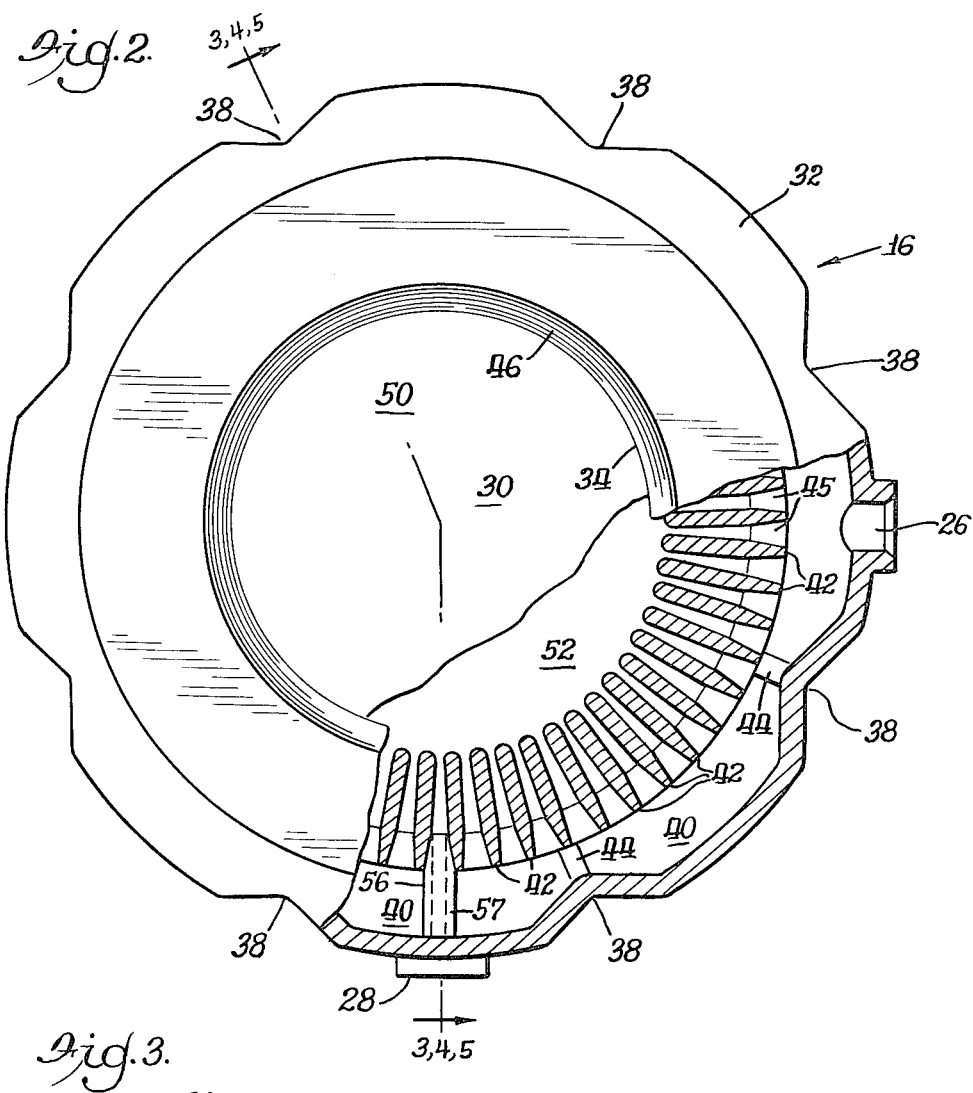
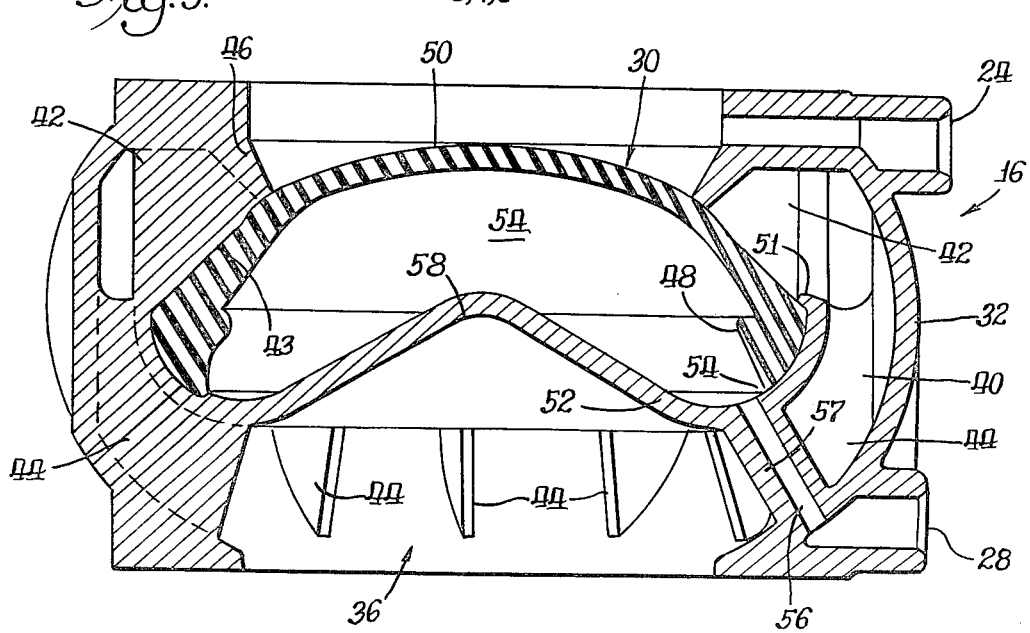

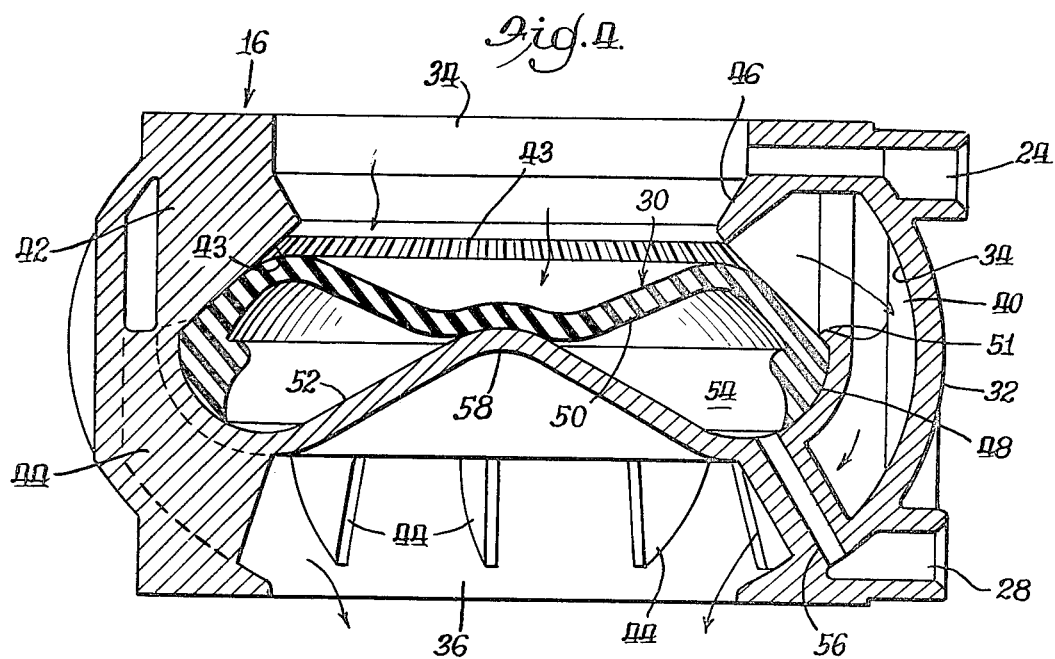
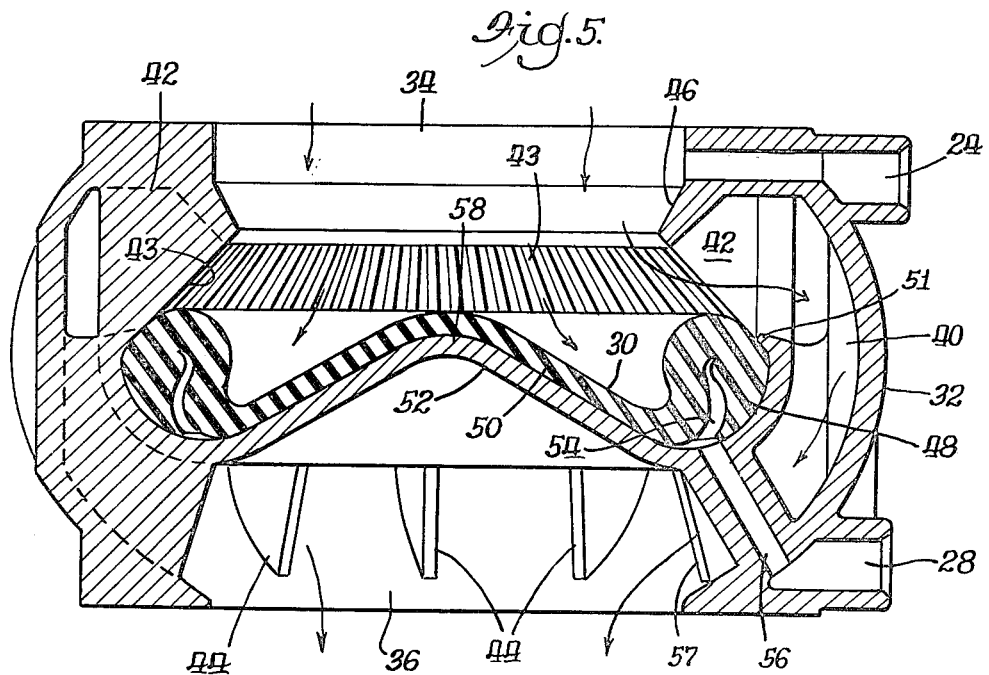

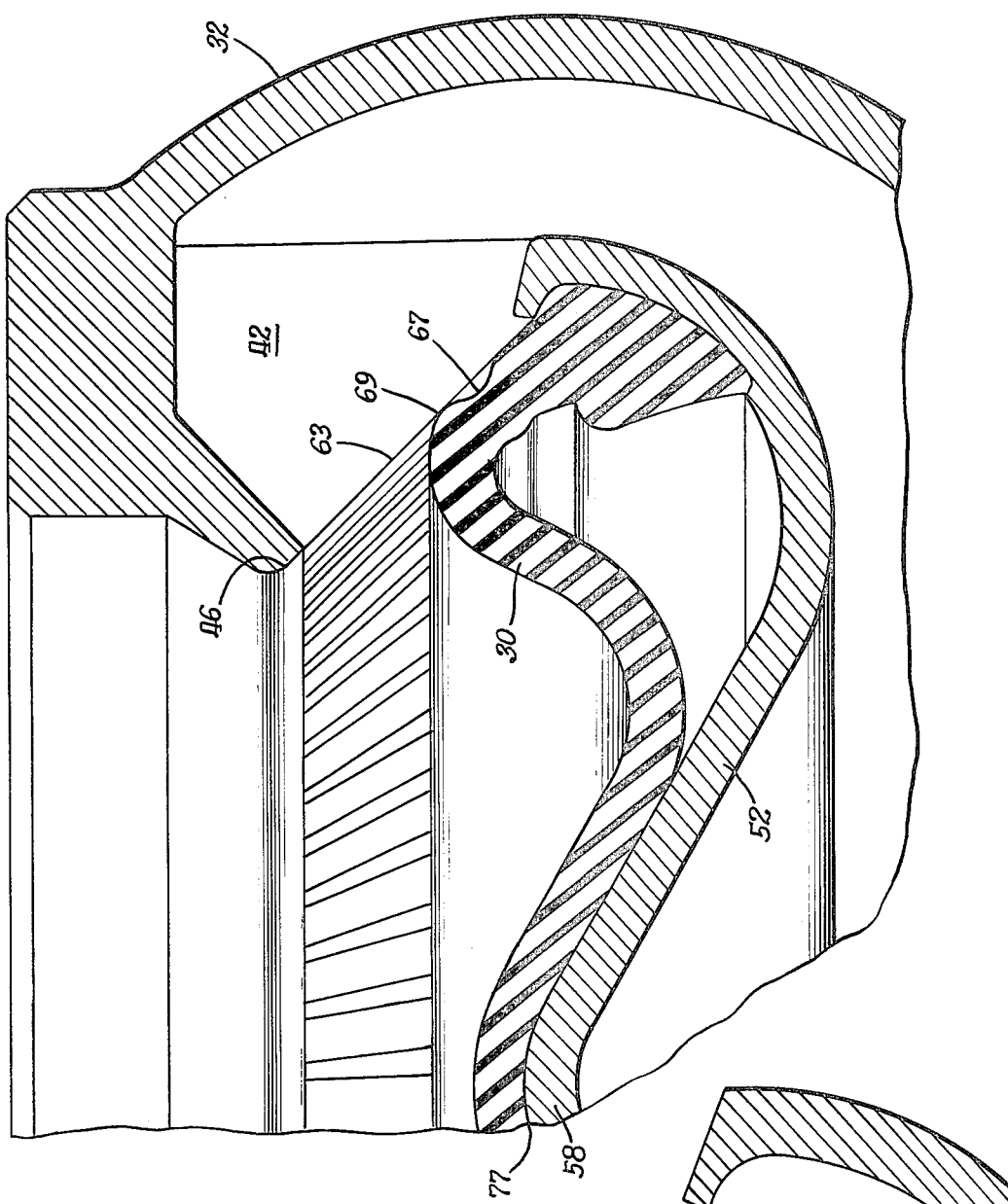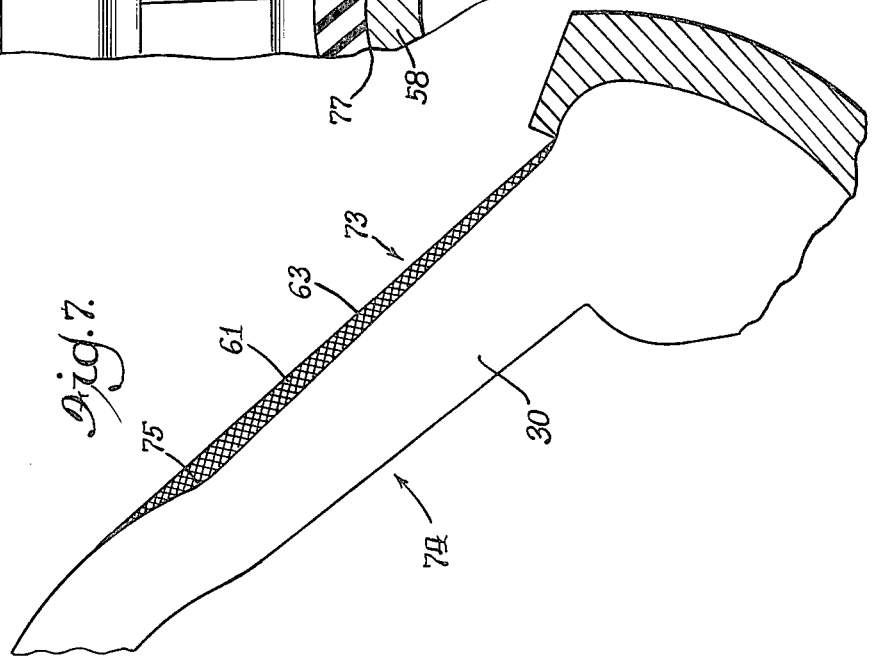

FLUID CONTROL VALVE AND LINER THEREFOR

This application is a continuation in part of U.S. patent application Ser. No. 730,962 filed Oct. 8, 1976 U.S. Pat. No. 4,198,029 entitled "Throttling Control Valve."

FIELD OF THE INVENTION

The present invention relates, generally, to fluid flow control valves which are sometimes referred to as throttling valves and, more particularly, to fluid flow control valves wherein the rate of flow through the valve is continuously variable.

The present invention is particularly directed to a rolling liner fluid control valve for controlling the rate of flow of gaseous or liquid fluids which has improved functional properties. The fluid flow control valve comprises a valve body having an inlet opening, an outlet opening substantially coaxial with the inlet opening, and an interior cavity between the inlet opening and the outlet opening. A baffle is provided which extends transversly across the central portion of the interior cavity. The baffle defines an annular passageway between the baffle and the wall of the valve body for flow of fluid therethrough. Plurality of ribs extend across the annular passageway to provide a generally frustoconical grill having a plurality of slots or ports between the ribs. The valve further includes an elastomeric, concavo-convex liner disposed on the upstream side of the baffle with its peripheral edge being received within a lip extending around the periphery of the baffle to provide a seal between the baffle and the liner. The combination of the baffle and liner defines a control chamber between the liner and the baffle.

Pressure control means, exterior of the control valve, are provided for decreasing and increasing the fluid pressure in the control chamber, frequently utilizing the same fluid as that flowing through the valve. When the pressure in the control chamber is greater or equal to the pressure at the upstream inlet opening of the valve, the concavo-convex liner over-lies all of the ports in the frustoconical grill, thereby obstructing flow of fluid through the ports and through the valve. As the pressure in the control chamber is decreased below the fluid pressure at the inlet opening of the valve, the pressure differential between the pressure at the inlet opening and the pressure in the control chamber causes the liner to invert; beginning at the apex of the liner, which is the furthermost upstream point of the liner. As inversion proceeds, the liner rolls downstream, past the valve seat and toward the upstream end of the ports in the frustoconical grill.

Before the liner rolls along the frustoconical grill to a position where the ports are exposed, the inverted apex of the liner contacts a central protuberance of the baffle, which supports a portion of the collapsed liner and provides improved regulation of the rolling inversion of the liner.

When the rolling edge of the inverting liner exposes the upstream edge of the ports of the frustoconical grill fluid flow through the slots, through the annular passageway and through the valve is initiated. As the pressure within the control chamber is further decreased, the liner rolls further along the frustoconical grill and exposes progressively greater areas of the ports, thereby permitting controlled and progressively increasing fluid flow through the valve. Eventually, at a pressure differential functionally related to the valve and liner diameter, the elasticity of the liner material and the geometry of the valve and liner, the liner will have rolled along the frustoconical grill to a position where all of the area of the slots or ports is exposed, permitting full flow through the valve. At the full open position, a major portion of the area of the inverted liner is draped against the baffle.

Increasing the pressure within the control chamber, thereby decreasing the pressure differential between that in the control chamber and that at the inlet opening of the valve, will cause the liner to roll in the opposite direction along the frustoconical grill, thereby decreasing the exposed area of the slots or ports until, finally, when the pressure within the control chamber reaches substantially the pressure at the inlet opening of the valve, the valve is fully closed and flow is stopped.

Fluid control valves utilizing rolling liners have unique, simple structure and have provided reliable accurate control for most operating conditions. Under some conditions, however, the liner tended to become unstable and to roll off the slots unevenly, particularly under conditions of low differential pressure across the liner and the grill. Also, under conditions of low differential pressure, the liner tends to over center to the full open position when opened to only a partial open position. A further problem was that when the liner was operated at a position where the liner was almost closed the liner tended to become unstable and to oscillate. A still further problem was that the liner sometimes required a substantial period of time of several minutes to attain a closed position. The present invention provides a fluid control valve with a rolling liner which has improved operating properties under all operating conditions.

DESCRIPTION OF THE PRIOR ART

Fluid flow through fluid systems such as a pipeline is often controlled by a throttling valve which includes one or more elastomeric expansion elements. In each of the known fluid flow control valves utilizing an elastomeric expansion element, the elastomeric element is biased against one or more ports by control pressure until a full open position is attained. Opening of the valve is accomplished by reducing the control pressure a sufficient amount below the inlet pressure to allow the upstream inlet fluid pressure to move the elastomeric element away from the port. This allows flow through the valve and the amount of flow is controlled by the extent to which the elastomeric element is moved relative to the ports. If the control pressure is further reduced, the valve is further opened causing an increased flow through the valve. Flow through the valve may be reduced or terminated by increasing the control pressure to again bias the elastomeric element over the ports. A typical fluid flow control valve utilizing an elastomeric element is described in U.S. Pat. No. 3,690,344.

Prior art throttling valves typically include a body having a plurality of components resulting in substantial manufacturing costs, a bulky design and a substantial number of potential leak paths. Moreover, prior art throttling valves having an elastomeric expansion element have operated by stretching or expending the element to open the valve. For example, some valves operate by circumferential stretching of the element as much as 30 percent when the valve is fully open. Repeated stretching of the elastomeric element causes loss of memory and failure of the elastomeric material after a relatively short period. Moreover, since the element is physically stretched or expanded for valve opening, substantial lowering of the control pressure is required to achieve full valve opening and the pressure differential across the elastomeric element must usually be very high.

A further element usually included in prior art fluid control valves utilizing an elastomeric element is an upstream grill. In these valves, fluid flows through the upstream grill prior to entering the control region of the valve containing the elastomeric element. When the valve is fully opened, a fluid pressure loss and a resultant velocity increase occur across the grill. The velocity can be high and the high velocity fluid flow directly impinges upon the elastomeric element causing erosion due to the high pressure, high velocity and entrained sediment. Severe erosion of the element results in increased service downtime and increased cost due to replacement of the elastomeric element. The pressure loss further results in limitation of the upstream loading pressure in order to obtain full opening of the valve.

A further disadvantage of many throttling valves is that a high velocity discharge jet is present in the downstream piping. A substantial length of downstream piping is required for the discharge flow to revert from kinetic pressure to a higher static pressure.

SUMMARY OF THE INVENTION

A principal object of the present invention is to provide a new and improved fluid control valve for use in fluid flow control applications.

Another object of the present invention is to provide a new and improved throttling control valve including only two components providing manufacturing economy and a compact design.

A further object of the present invention is to provide a new and improved throttling control valve that employes a deformable elastomeric lining operable in a rolling fashion to throttle the valve, which has improved operating properties under conditions of low pressure differential across the liner.

Briefly, the present invention relates to a new and improved servo-operated, fluid control valve that may be employed to control fluid flow through a fluid system such as a gas or liquid pipe line. The valve includes a body defining an interior chamber or cavity and having an inlet and outlet in fluid communication with the cavity. The body further includes a baffle to which is mounted an elastomeric, deformable valve liner. The liner in the valve closed position seals against a seat defined within the body and also seals against a grill that defines a plurality of annular flow paths through the body. Specifically the present invention includes the improvement of providing a relieved region at the interface between the liner and the grill. The present invention also includes the improvement of providing a central depressed portion in the liner.

BRIEF DESCRIPTION OF THE DRAWINGS

The present invention together with the above and other objects and advantages will be apparent from the following detailed description and the illustrative embodiment of the invention shown in the accompanying drawings, wherein:

FIG. 2 is a horizontal view, partly in section, of a throttling control valve constructed in accordance with the present invention;

FIG. 3 is a cross-sectional view of the throttling control valve, in a valve closed position, taken along line 3—3 of FIG. 2;

FIG. 4 is a cross-sectional view of the throttling control valve in a partially open position taken along line 4—4 of FIG. 2; and FIG. 5 is a cross-sectional view of the throttling control valve in a full open position taken along line 5—5 of FIG. 2;

FIG. 7 is an enlarged view of the dotted area of FIG. 6; and

FIG. 8 is a schematic view showing various operating features of the control valve.

DESCRIPTION OF THE VALVE OPERATION

Figure 1:
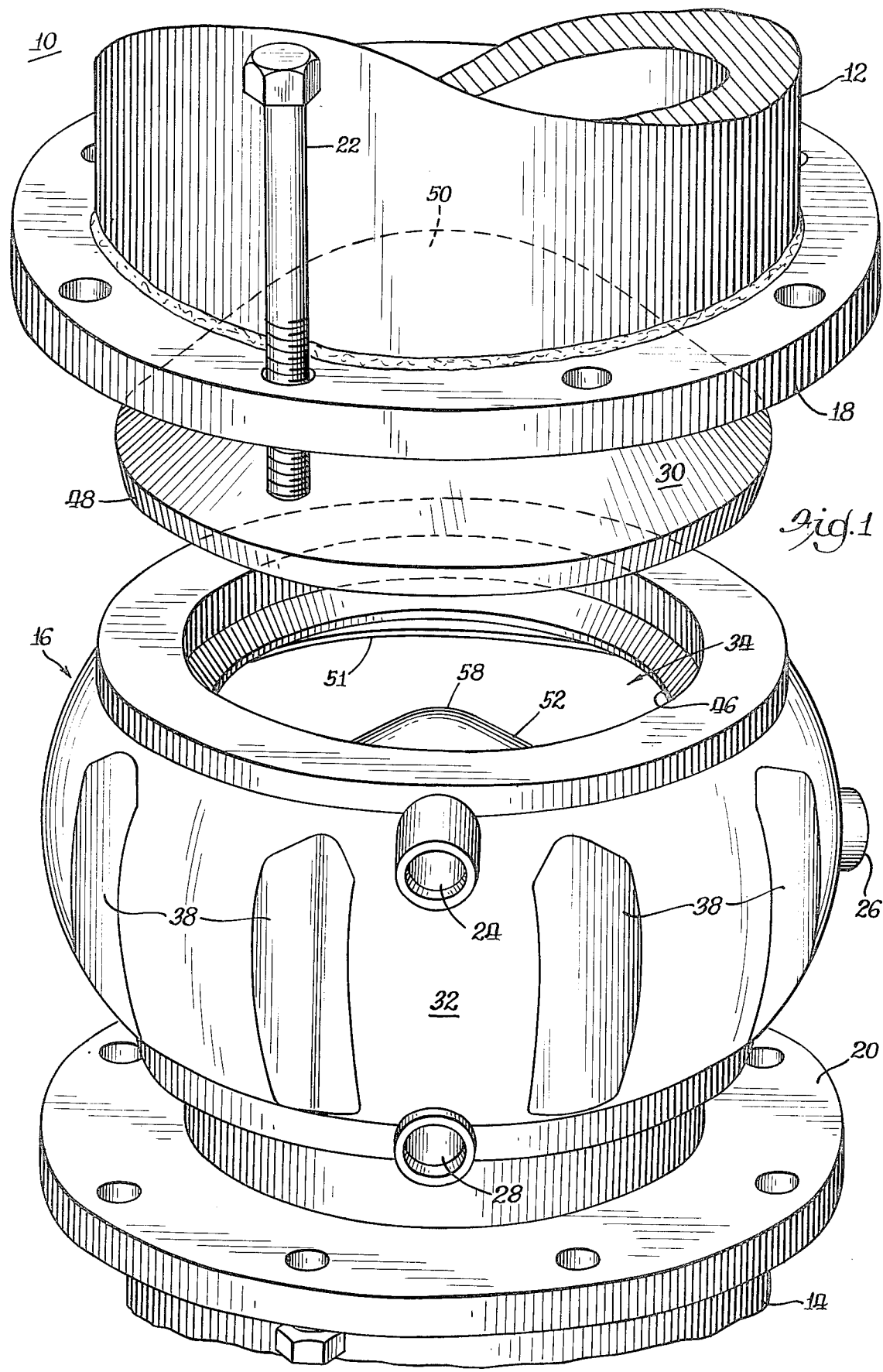
FIG. 1 is an exploded perspective view of a segment of a fluid pipe line incorporating a throttling control valve constructed in accordance with the present invention.

Having reference now to the drawings, and initially to FIG. 1, there is illustrated a portion of a fluid pipe line system designated as a whole by the reference numberal 10 including pipes 12 and 14 and a throttling control valve generally designated by the numeral 16 that is employed to control the flow of liquid or gas through the pipe line system 10. The valve 16 is mounted between the flanges 18 and 20 of the pipes 12 and 14. Once the valve 16 is positioned between the flanges 18 and 20, the pipes 12 and 14 are joined by several bolt fasteners 22.

Opening and closing of the valve 16 is controlled by application of control pressure to a control port 28. In a typical installation, an external regulator (not shown) is coupled to the valve 16 to sense fluid pressures upstream or downstream of the valve 16 and to vary the control pressure communicated to the valve 16. The regulator is interconnected with the valve 16 by means of a port 24, a port 26, and the control port 28 provided in the valve 16.

The valve 16 utilizes a deformable, elastomeric liner 30. The liner 30 is actuated by upstream pressure as control or loading pressure introduced into control port 28 is varied and deforms or rolls within the valve 16 to control fluid flow. The liner 30 is not stretched or expanded to provide valve opening and thus avoids the disadvantage of loss of memory of the elastomeric material that often results in malfunctioning of the valves employing an expansion element.

More specifically, the valve 16 includes a housing 32 and the opening liner 30. The body 32 includes an inlet opening 34 and an outlet opening 36. The valve 16 is intended to be mounted between the flanges 18 and 20 of the pipes 12 and 14 such that the inlet 34 and outlet 36 are centered with the pipes 12 and 14 and in line with the fluid flow. To allow the valve 16 to be employed between flanges having different load ratings, each including a different pattern of fasteners 22, the housing 32 is fluted to include a plurality of grooves 38 on its outer periphery. In this manner, each of the fasteners 22 employed in, for example, a four inch line with a 150 lb. flange bolt pattern will nest within a groove 38, thereby accurately centering the valve. The enlarged diameter regions 40 between the grooves 38 provide increased flow capacity as compared with prior art valves designed for use with a 150 lb. bolt circle.

The valve 16 may also be employed in a system including pipes 12 and 14 requiring a different fastener pattern, such as a 300 lb. flange bolt pattern. In this pattern, the fasteners 22 lie in a circle larger than the 150 lb. bolt circle, and the housing 32 is centered within this larger pattern. For example, the individual fasteners 22 can engage the housing 32 in the circular cylindrical regions between the grooves 38 so as to center the housing. Alternatively, if the bolt circle is not large enough to enclose the major diameter of the housing, the housing 32 can be rotated so that the bolts 32 are cammed against the sloping sides of grooves 38 in order to center the housing. Accordingly, the same valve 16 can accommodate different systems 10 having different flange ratings with different numbers of bolts 22 and different bolt circle sizes. The valve is centered within the pattern of the fasteners without the necessity for centering tubes or collars such as used in the past.

Fluid flows through the valve 16 along a plurality of flow paths 40 defined between the grooves 38 of the fluted housing 32. The flow paths 40 generally define an annular flow path which extends from the inlet opening 34 to the outlet opening 36. Support ribs 44 extend inwardly from grooves 38 and are positioned between the regions 40. A plurality of ribs 42 located within the housing 32 define a generally frustoconical grill having a plurality of slots or ports 45 between the ribs 42. The housing 32 also includes a valve seat 46 located adjacent the inlet 34 and adjacent the grill 43 such that fluid entering the inlet 34 flows over the valve seat 46, through the ports 45, through the regions 40, and through the outlet 36.

Flow through the valve 16 is controlled by the interaction of the liner 30 with the valve seat 46 and the ribs 42. More specifically, the liner 30 is of a generally parabolic or concavo-convex configuration including a peripheral edge 48 and an intermediate or central portion 50. To assemble the valve 16, the liner 30 is inserted into the valve 16 through the inlet 34 until the edge 48 seats within a lip 51 of a cone-shaped control chamber wall or baffle 52 located within the housing 32. Once the liner 30 is mounted within the valve housing 32, the intermediate portion 50 of the liner 30 seals against the seat 46 and the ribs 42 in the valve closed position. A control pressure chamber 54 is defined between the baffle 52 and the inner peripheral surface of the liner 30.

Once fluid flow is introduced into the system 10, the valve 16 is opened by a rolling action of the liner 30 off the seat 46 and the ribs 42 in response to upstream pressure at the inlet 34. Control of the position of the liner 30 relative to the seat 46 and the ribs 42 is provided by varying a control pressure within the chamber 54. The chamber 54 is coupled to a source of control pressure through a conduit 56 defined within a strut 57 that is in fluid communication with the control port 28. In this manner, the magnitude of fluid pressure in the control chamber 54 is varied by an outside source, such as the regulator described in U.S. Pat. No. 4,083,375.

In the valve closed position (FIG. 3), the control or loading pressure in the chamber 54 is equal or greater than the upstream pressure in the pipe line system 10. The loading pressure presses the intermediate portion 50 of the liner 30 against the grill surface 43 and the seat 46. The valve seat 46 is fabricated such that it projects slightly (not shown) from the plane of the grill 43 to allow the seat 46 to extend into the material of the liner 30 farther than the ribs 42, thereby concentrating the sealing force on the seat 46 and assuring positive shut off.

If the conditions downstream of the valve 16 require valve opening due to a demand for fluid, the liner 30 is deformed into a partial valve open position as a result of the pressure differential between the upstream and the control pressure within the liner 30 (FIG. 4). As this occurs, the central portion 50 of the liner 30 inverts and comes to rest upon the tip 58 of the chamber wall 52.

More specifically, if, for example, upstream pressure were 300 psi. and downstream pressure were 50 psi., the control pressure would be 300 psi. or more in the valve closed position. To commence opening the valve 16, the control pressure may be reduced to, for example, 290 psi. The pressure differential of 10 psi. across the unsupported portion of the liner 30 (that portion not sealed against the seat 46 and grill 43 results in a rolling force equal to the area of the unsupported portion times the pressure differential of 10 psi. This force inverts the unsupported portion causing it to drape over the tip 58. That portion of the liner that is in contact with the tip 58 no longer has the control pressure acting against it, thus reducing the area of the unsupported portion of the liner 30. There is also a clamping force equal to the pressure differential of 240 psi. (control pressure less downstream pressure) times the area of the supported portion of the liner 30 (that portion sealing the diaphragm against the seat 46 and the grill 43) which clamps supported portion against the seat 46 and the grill 43.

The difference between the rolling and clamping forces tends to roll the liner 30 off of the seat 46 and the ribs 42 with lowering of control pressure, effecting gradual valve opening. The resultant rolling of the liner 30 relative to the frusto-conical grill 43 defined by the ribs 42 provides a variable opening of the valve 16.

To open the valve 16 further, the control or loading pressure is further reduced. As this occurs, a greater area of the liner 30 is supported by the baffle 52, but the area of the liner 30 supported by the grill 43 is simultaneously reduced and the difference in the rolling and clamping forces causes further rolling of the liner 30. A progressive proportional relationship between liner movement and control pressure is provided by the truncated cone configuration of the grill surface 43 defined by the ribs 42 and by the conical configuration of the baffle 52. The configuration of the baffle 52 defines the area of the liner 30 that remains unsupported and acted upon by the pressure difference of the upstream and control pressures, thereby determining the magnitude of the force tending to roll the liner 30. The truncated cone configuration of the rib surface 43 defines the area of the liner 30 that is supported by the ribs 42 thereby determining the magnitude of the clamping force.

Full valve opening (FIG. 5) occurs if the chamber 54 is fully vented. Passage 56 remains in communication with chamber 54 in the fully open position. Restoring the control pressure within the chamber 54 to inlet pressure returns the valve 16 to the closed position.

DETAILED DESCRIPTION OF THE INVENTION

The fluid control valve described hereinabove is a unique, simple valve construction and has worked satisfactorily for controlling fluid flow under most operating conditions. Under certain operating conditions, however, the fluid flow control valve described hereinabove has been observed to have certain operating anomalies. Under some conditions the liner 30 would tend to become unstable and the liner 30 would roll off the grill surface 43 unevenly as the liner progressed from the fully open to the closed position. Under some conditions the liner would overcenter to the full open position when the liner was about two thirds open. Moreover, the liner 30 was frequently slow to return to the fully closed position from an open position, sometimes taking several minutes to fully close against the valve seat 46 in the valve housing.

In accordance with the present invention it has been discovered that the fluid flow control valve described hereinabove can be modified to provide construction which has improved stability under all operating conditions. The anomalies, particularly the slow closing problem of the fluid flow control valve described hereinabove, are overcome by the valve construction of the present invention.

It has been found that providing a relieved region 61 (shown crosshatched in FIG. 7) between the liner 30 and the ribs 42 at the line of intersection 63 between the liner 30 and the ribs 42 provides improved stability and faster return to a fully closed position. The term "line of intersection" refers to a line formed by an imaginary plane which is normal to a cross-sectional surface of the valve extending through an axis and which extends from the intersection of the liner 30 and the valve seat 46 at one end and to the intersection of the liner 30 and the ribs 42 at the furthermost downstream point when the liner is in a valve closed position.

The line of intersection generates an imaginary frustoconical surface which lies between the liner 30 and the frustoconical surface defined by the ribs 42. In accordance with the invention, the liner 30 has an outer frustoconical face which is spaced from the confronting inner face of the frustoconical grill defined by the ribs 42 along the line of intersection when the pressure in the control chamber 54 is equal to the pressure in the ports 45 when the liner is in a valve closed position.

Figure 6:
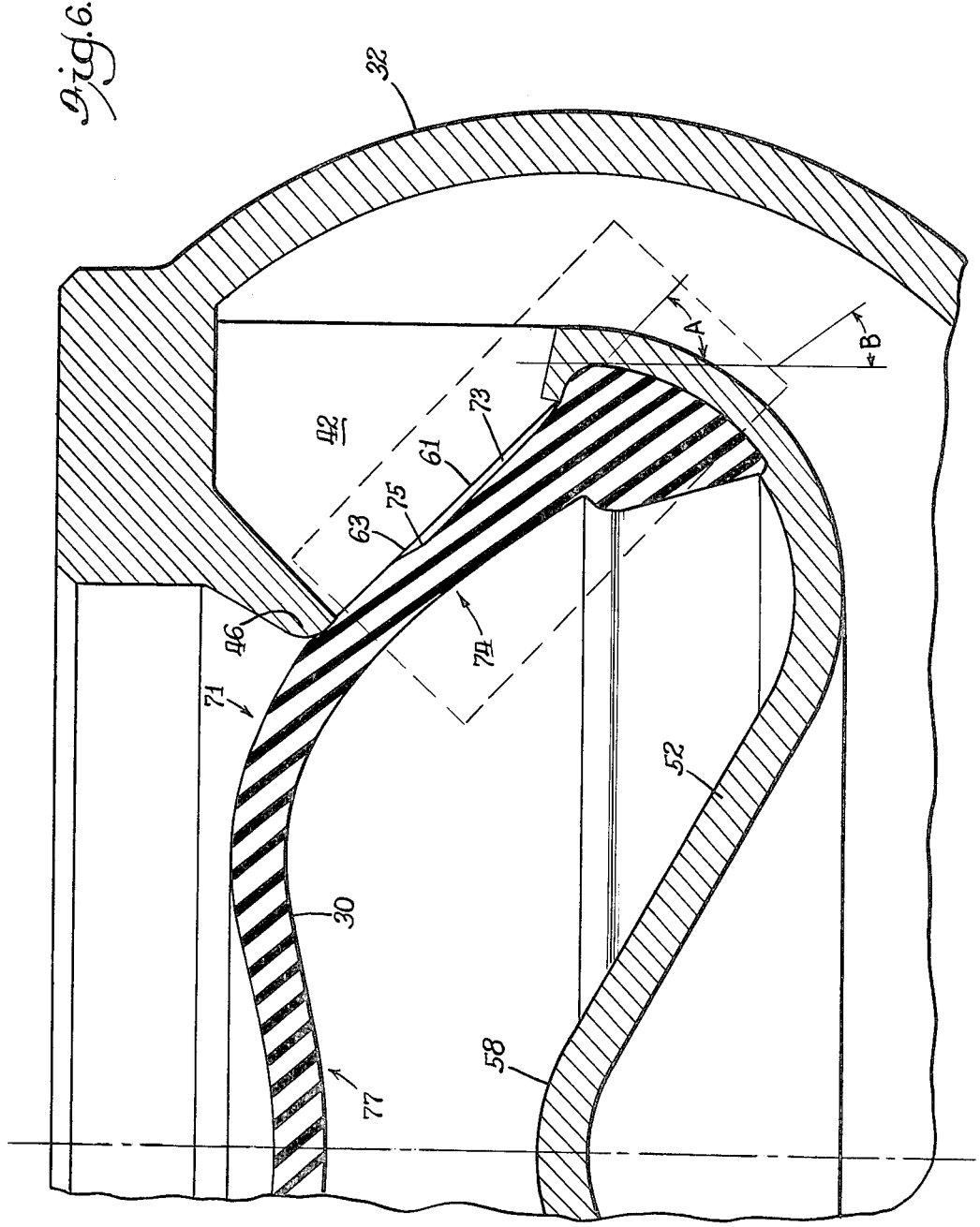
FIG. 6 is a partial cross-sectional view of a throttling control valve, in a valve closed position taken along line 6—6 of FIG. 2 which embodies the improved features of the invention.

As best seen in FIG. 6, the valve construction of the present invention includes a further modification of the liner 30 to improve stability during the early stages of opening the valve. The liner 30 includes a top portion 77 that is depressed relative to a plane which touches the uppermost portion of the liner. The depression in the top portion 77 allows earlier contact of the liner 30 with the tip 58 of the baffle 52 as the liner 30 moves from the closed position. The early contact of the liner 30 with the tip 58 of the baffle 52 provides increased liner stability and more even liner movement during the operation of the valve in the partially open position. Since the valve during the control mode is almost always in a partially open position, the improved stability of the liner provided by the depressed tip is extremely important. Preferably, the depression in the top portion is sufficient to place the lowermost part of the top portion closer to the tip 58 by a distance of from about 1 to about 5 percent of the outside diameter of the liner.

The relieved region 61 may be provided by altering the shape of the liner 30 or by relieving the surface of the ribs 42 which form the grill. In general the width of the relieved region is not critical and does not have to be uniform throughout the length. Generally, the width is at least about 2 percent of the width of the liner and does not exceed about 50 percent of the width of the liner at any point along the length of the relieved region. It is not necessary for the relieved region 61 to extend the full length of the line of intersection 63. It is preferred, however, that the relieved region 61 extend to a point spaced from each end of the line of intersection to a point which is at least 25 percent of the length of the plane of intersection.

It is preferred to provide the relieved region 61 by modifying the shape of the liner 30. As best seen in FIG. 6, the relieved region 61 can be provided by the following liner construction. The top curved peripheral portion 71 is extended past the sealing edge 46 so that the liner 30 begins to curve away from the line of intersection 63. An outer peripheral, generally straight, side portion 73 extends along an angle, designated as "A", relative to the central axis of the liner 30. The angle "A" is of sufficient extent to define an abrupt discontinuity 75 between the side portion 73 and the curved portion 71. Preferably, angle "A" has a value of from about 40 degrees to about 50 degrees, most preferably about 45 degrees. The relation between the angle "A" and the extended curved peripheral portion 71 relieves the side portion 73 relative to the ribs 42. The relationship between the liner 30 and the ribs 42 then becomes one of having a wedge-shaped relieved region at the line of intersection 63.

Such relieved region can be provided by the liner construction indicated above or can be provided by altering the shape of the ribs 42 or by a combination of these two methods. The relieved region is preferably wedge-shaped but can be of any convenient shape, such as rectangular, triangular, diamond-shaped, or curvilinear.

The inner peripheral surface of the side portion 74 of the liner 30 extends along a second angle, designated as "B", relative to the central axis. Angle "B" is preferably less than angle "A" so that the cross section of liner 30 included between angle "A" and angle "B" is tapered to a greater thickness adjacent the rim of the liner 30 than at intermediate sections of the liner 30. Preferably, angle "B" has a value of from about 30 degrees to about 45 degrees, most preferably about 35 degrees. It should be understood that a tapered cross section for liner 30 is a preferred embodiment, but that a uniform cross section can be used and angle "A" can be equal to angle "B".

While not wishing to be bound by any theory it is believed that the improved operation of the valve construction of the present invention is related to both the spatial configuration of the liner and valve body and the dynamic operating properties of the liner during control of the valve in a partially open position. More specifically, it is believed that friction between the liner and the ribs forming the grill is reduced during rolling and unrolling of the liner by providing a bearing effect at a region of substantially zero pressure differential which occurs along the peripheral surface of the liner. It is believed that when the valve is partially open, there will always be a point along the peripheral surface of the liner 30 where the pressure differential across the liner 30 is substantially zero.

As a specific example, when the upstream pressure is 300 psi. and the downstream pressure which is being controlled is 50 psi. the control pressure in the chamber 54 must be intermediate the upstream pressure and the downstream pressure at any position where the valve is in a partially open position. The control pressure will usually be closer to the upstream pressure than the downstream pressure. As the upstream pressure is throttled through the ports 42 and the annular passageway 40 to the downstream pressure, the upstream pressure undergoes a transition from 300 psi. to 50 psi. Because of the substantially larger valve body provided by the valve construction of the present invention, it is believed that this transition is substantially complete slightly downstream from the leading edge of the rolling liner. Since the transition is from 300 psi. (upstream) to 50 psi (downstream) there is a point slightly downstream from the leading edge of the liner where the pressure on the exterior side of the liner is substantially the same as the intermediate control pressure on the interior side of the liner.

When the valve is operated at a pressure differential between the control chamber 54 and the area between the slots 42, which exceeds the elastic limits of the liner 30, the liner is deformed by the pressure differential into the relieved area and into contact with the ribs 42 and there is no relief between the liner and the ribs. It is believed, however, that at the point of zero pressure differential and for a slight increment on each side of this point, the elastic properties of the liner are sufficient to hold the liner free from contact with the ribs 42. This results in forming a pocket where the liner 30 is spaced from the ribs 42. This pocket is filled with the fluid being controlled which then acts as a bearing to reduce friction and permit easier rolling movement of the liner.

It is believed that the configuration of the liner at the leading edge of the liner during rolling movement between the open and closed position is represented by FIG. 8. As shown in FIG. 8, a pocket 67 is believed to be formed by the elastic properties of the liner 30 at a point of substantially zero pressure differential. The formation of the pocket, furthermore, alters the geometry of the leading edge 69 of the rolling liner. The formation of the pocket reduces the amount of force exerted by the liner which is normal to the surface of the ribs 42. The combination of the reduction in force normal to the surface of the ribs and the reduce friction caused by the bearing effect of the pocket permits much easier movement of the leading edge 69 of the rolling liner.

The improved fluid control valve construction of the present invention provides substantial benefits under all conditions of operation. The fluid control valve of the invention is particularly adapted, however, to operation where the pressure differential between the control chamber and the downstream pressure is relatively low.

It will be readily apparent that the improved fluid control valve construction of the present invention is susceptible to various modifications which are considered to be within the scope of the invention as set forth in the following appended claims. For example, the entire valve, other than the liner, can have an integral one piece construction. Alternatively, the various components of the valve, such as the housing, ribs and baffle, can be separate pieces which are fastened together during installation by suitable fasteners.

What is claimed is:

1. In a valve for controlling fluid flow through a conduit including a housing defining an inlet opening, a substantially coaxial outlet opening and an interior cavity therebetween, a baffle extending transversely across the central portion of the cavity to define an annular passageway for the flow of fluid from the inlet opening to the outlet opening, a plurality of ribs extending from the periphery of the baffle toward the inlet opening of the housing to provide a generally frustoconical grill having a plurality of ports therein, an elastomeric, concavo-convex liner disposed on the upstream side of the baffle with its peripheral edge in sealing relation with the periphery of the baffle so as to define a control chamber between the liner and the baffle, the inner surface of said grill and the outer surface of said liner being in confronting relation, the baffle having a central protuberance projecting toward the liner upon which the liner is draped during inversion of the liner, and means for decreasing and increasing the fluid pressure in the control chamber, a decrease of the pressure in the chamber causing the liner to invert and to roll along the frustoconical grill from a closed position where all of the ports are covered by the liner to positions where progressively greater areas of the ports are exposed, thereby permitting controlled and progressively increasing fluid flow through the ports and through the annular passageway, an increase in the pressure of the chamber causing reverse movement of the liner, the improvement comprising disposing the inner surface of said grill and the outer surface of said liner so that with the valve in its closed position said surfaces are spaced apart from each other.

2. The valve of claim 1 wherein at least a portion of said confronting outer surface of said liner is relieved.

3. The valve of claim 1 wherein at least a portion of said confronting inner surface of said grill is relieved.

4. The valve of claim 1 wherein said confronting surfaces are spaced apart a distance of from about 2 percent to about 50 percent of the thickness of said liner at said confronting outer surface thereof.

5. A liner for use in a fluid control valve including a housing defining an inlet opening, a substantially coaxial outlet opening and an interior cavity therebetween, a baffle extending transversely across the central portion of the cavity to define an annular passageway for the flow of fluid from the inlet opening to the outlet opening, a plurality of ribs extending from the periphery of the baffle toward the inlet opening of the housing to provide a generally frustoconical grill having a plurality of ports therein, an elastomeric, concavo-convex liner disposed on the upstream side of the baffle with its peripheral edge in sealing relation with the periphery of the baffle so as to define a control chamber between the liner and the baffle, the inner surface of said grill and the outer surface of said liner being in confronting relation, the baffle having a central protuberance projecting toward the liner upon which the liner is draped during inversion of the liner, and means for decreasing and increasing the fluid pressure in the control chamber, a decrease of the pressure in the chamber causing the liner to invert and to roll along the frustoconical grill from a closed position where all of the ports are covered by the liner to positions where progressively greater areas of the ports are exposed thereby permitting controlled and progressively increasing fluid flow through the ports and through the annular passageway, an increase in the pressure of the chamber causing reverse movement of the liner, said liner having an outer surface which with the valve in its closed position is spaced apart from the inner surface of said grill, said outer surface being conical over a portion of its area of confrontation with the inner surface of said grill adjacent the periphery of said baffle.

6. The liner of claim 5 wherein the outer surface thereof is toroidal over the remaining portion of its area of confrontation with the inner surface of said grill.

7. The liner of claim 5 wherein the thickness of said liner in its conical section decreases from the periphery of said baffle toward the inlet opening of said baffle.

* * * * *